United States Patent
Colton et al.

(10) Patent No.: US 8,572,602 B1
(45) Date of Patent: *Oct. 29, 2013

(54) SYSTEM AND METHOD FOR SYNCHRONIZATION OF A WEB APPLICATION TO A CLOUD PROVIDER

(75) Inventors: Paul Colton, Hillsborough, CA (US); Uri Sarid, Menlo Park, CA (US)

(73) Assignee: Appcelerator, Inc., Mountain View, CA (US)

( * ) Notice: Subject to any disclaimer, the term of this patent is extended or adjusted under 35 U.S.C. 154(b) by 957 days.

This patent is subject to a terminal disclaimer.

(21) Appl. No.: 12/478,746

(22) Filed: Jun. 4, 2009

Related U.S. Application Data

(60) Provisional application No. 61/059,260, filed on Jun. 5, 2008.

(51) Int. Cl.
  *G06F 9/44* (2006.01)
  *G06F 9/445* (2006.01)
  *G06F 15/177* (2006.01)

(52) U.S. Cl.
  USPC ........... 717/177; 717/172; 717/176; 717/178; 709/220; 709/221; 709/222

(58) Field of Classification Search
  None
  See application file for complete search history.

(56) References Cited

U.S. PATENT DOCUMENTS

| | | | |
|---|---|---|---|
| 5,945,989 A * | 8/1999 | Freishtat et al. | 715/760 |
| 6,453,335 B1 | 9/2002 | Kaufmann | |
| 6,563,800 B1 * | 5/2003 | Salo et al. | 370/264 |
| 6,609,246 B1 | 8/2003 | Guhr et al. | |
| 7,020,697 B1 * | 3/2006 | Goodman et al. | 709/223 |
| 7,162,467 B2 * | 1/2007 | Eshleman et al. | 1/1 |
| 7,284,054 B2 * | 10/2007 | Radhakrishnan | 709/226 |
| 7,596,620 B1 * | 9/2009 | Colton et al. | 709/226 |
| 7,814,234 B2 * | 10/2010 | Hawkins et al. | 709/250 |
| 7,958,232 B1 * | 6/2011 | Colton et al. | 709/224 |
| 2003/0046396 A1 * | 3/2003 | Richter et al. | 709/226 |
| 2004/0177335 A1 | 9/2004 | Beisiegel et al. | |
| 2006/0168547 A1 * | 7/2006 | Boyles et al. | 715/854 |
| 2006/0271341 A1 * | 11/2006 | Brown et al. | 703/1 |
| 2007/0106753 A1 * | 5/2007 | Moore | 709/217 |

(Continued)

OTHER PUBLICATIONS

Amazon EC2 Developer Guide, Amazon.com (Jan. 3, 2007), retrieved from http://web.archive.org/web/20070306215328/http://developer.amazonwebservices.com/con nectJent ry.jspa?external ID= 610&cate goryID=87.*

Amazon Elastic Compute Cloud (Amazon EC2)—Limited Beta, Amazon.com (Dec. 7, 2006), retrieved from http://web.archive.org/web/20061207151541/http://www.amazon.com/b?ie=UTF8&node=201590011.*

"Hoorah for Aptana Cloud" by Mahemoff at Mahemoff's blog, Apr. 28, 2008.*

*Primary Examiner* — Henry Tsai
*Assistant Examiner* — Jing-Yih Shyu
(74) *Attorney, Agent, or Firm* — Paul K. Tomita

(57) ABSTRACT

A system and method for synchronization of a web application to a cloud provider is disclosed herein. Preferably, a cloud manager synchronizes the web application to a single cloud provider or to multiple cloud providers. The system and method preferably allows for automatic wiring from a cloud provider to a web application, and allows for use of different Web resources from multiple cloud providers. The cloud manager also preferably allows for concurrent synchronization to multiple cloud providers.

19 Claims, 14 Drawing Sheets

(56) References Cited

U.S. PATENT DOCUMENTS

| | | | |
|---|---|---|---|
| 2007/0150480 A1* | 6/2007 | Hwang et al. | 707/10 |
| 2007/0244906 A1* | 10/2007 | Colton et al. | 707/10 |
| 2008/0104195 A1* | 5/2008 | Hawkins et al. | 709/217 |
| 2008/0126943 A1* | 5/2008 | Parasnis et al. | 715/730 |
| 2008/0301562 A1* | 12/2008 | Berger et al. | 715/733 |
| 2009/0182565 A1* | 7/2009 | Erickson et al. | 705/1 |
| 2009/0299905 A1* | 12/2009 | Mestha et al. | 705/76 |
| 2009/0300149 A1* | 12/2009 | Ferris et al. | 709/222 |
| 2009/0307094 A1* | 12/2009 | Manos | 705/14.73 |

* cited by examiner

SYSTEM AND METHOD FOR SYNCHRONIZATION OF A WEB APPLICATION TO A CLOUD PROVIDER

CROSS REFERENCE TO RELATED APPLICATION

The Present Application claims priority to U.S. Provisional Patent Application No. 61/059,260, filed on Jun. 5, 2008, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to cloud computing. More specifically, the present invention relates to a system and method for synchronization of a web application to at least one cloud provider.

2. Description of the Related Art

In general terms, cloud computing provides a developer (individual or company) to have access to resources for a Web application, in particular a web site. Various vendors provide cloud computing to the developer community. Such vendors include JOYENT (see joyent.com), Amazon Web Services (See amazon.com), Google App Engine (see http://code.google.com/appengine/) and others.

General definitions for terms utilized in the pertinent art are set forth below.

Applets or Java Applets are mini-executable programs named with the .class suffix and are placed on the web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Asynchronous Server-Side Processing is a means for avoiding having to reload a new page for every request sent by a client and involves placing a intermediary between a client and server in order to send a request to the intermediary (i.e. XMLHttpRequest object) which sends it to the server for processing and receives the response from the server for passing on to the client.

Boot or Bootstrap refers to loading the first piece of software that starts a computer since the operating system is essential for running all other programs, it is usually the first piece of software loaded during the boot process.

A Channel is information about organized content on an intranet or the Internet. Channels enable Web developers to categorize and describe Web site content and make that data available to users on demand.

Cloud computing is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

FTP or File Transfer Protocol is a protocol for moving files over the Internet from one computer to another.

HyperText Markup Language (HTML) is a method of mixing text and other content with layout and appearance commands in a file, so that a browser can generate a display from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid a representation of program information that can be read by another program.

MySQL is a relational database management system which relies on SQL for processing data in a database.

Parser is a component of a compiler that analyzes a sequence of tokens to determine its grammatical structure with respect to a given formal grammar. Parsing transforms input text into a data structure, usually a tree, which is suitable for later processing and which captures the implied hierarchy of the input. XML Parsers ensure that an XML document follows the rules of XML markup syntax correctly.

Platform is the combination of a client computer, an operating system, and a browser, which together can support HTTP access and in particular the operation of interactive forms.

Portlet is a Web based component that will process requests and generate dynamic content. The end-user essentially sees a portlet as being a specialized content area within a Web page that occupies a small window. One could use this content area (the portlet) to receive different types of information. The portlet provides users with the capability to customize the content, appearance and position of the portlet.

Provisioning is the act of supplying and configuring computing resources, primarily servers, for a web application.

Pulling or Pull Technology is technology that enables Web browsers to retrieve information from a Web server such as updating information at periodic intervals, essentially Web browser initiated activity.

Pushing or Push Technology is technology that initiates delivery of material from a server to a properly configured Web browser, such as providing automatic updates to a Web browser.

Serialization places an object in a binary form for transmission across a network such as the Internet and deserialization involves extracting a data structure from a series of bytes.

Servlets are objects that receive requests and generate a response based on that request.

SQL (Structured Query Language) is a computer language designed for data retrieval and data management in a database.

Structural layer of a web page is the marked up document and foundation on which other layers may be applied.

URL or Uniform Resource Locator is a address on the World Wide Web.

User is a client computer, generally operated by a human being, but in some system contexts running an automated process not under full-time human control.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages. As shown in FIG. 1A, a cloud computing system 20' of the prior art generally involves a single cloud provider 28' which is accessed from a user 22' at a user interface 24' over a network such as the Internet. The user 22' can only work with the single cloud provider 28' and is provided very little information about the performance of the web application on the cloud provider 28'. Further, in order to scale up, the user 22' must repeat the uploading process.

However, current technologies fail to provide a system and method for facilitated synchronization of a web application to a single cloud provider, and also fail to provide a system and method for synchronization of a web application to multiple cloud providers.

BRIEF SUMMARY OF THE INVENTION

The Present Invention overcomes the obstacles of the prior art and provides a method and system for synchronizing a web application to multiple cloud providers, and for facilitated synchronization of a web application to a single cloud provider.

One aspect is a method for facilitated synchronization of a web application to a cloud provider. The method includes accessing a remote cloud manager. The method also includes selecting a plurality of web resources for the web application at the remote cloud manager. The plurality of web resources located at at least one cloud provider. The method also includes identifying a plurality of authored works for the web application. The method also includes synchronizing the plurality of web resources and the authored works to deploy the web application to a cloud provider.

The plurality of authored works preferably includes graphic files, HTML documents and audio files. The plurality of authored works also preferably includes flash documents, PHP documents and JavaScript documents. Synchronizing the plurality of web resources and the authored works to deploy the web application to a cloud provider preferably comprises provisioning the web application and deploying the web application to the cloud provider.

Identifying a plurality of authored works for the web application preferably comprises providing a file location for each of the plurality of authored works to the cloud manager.

Another aspect is a system for facilitated synchronization of a web application to a cloud provider. The system includes a network, a plurality of cloud providers, a plurality of authored works and a cloud manager. Each of the plurality of cloud providers is accessible over the network. Each of the plurality of cloud providers includes a plurality of web resources. Each of the plurality of authored works for the web application is located at a user site. The cloud manager identifies the plurality of authored works for the web application, selects from the plurality of web resources for the web application and synchronizes the plurality of web resources and the authored works to deploy the web application to a cloud provider.

The cloud manager can preferably synchronize to multiple targets comprising public, private and staging. The cloud manager can preferably concurrently synchronize to each of the plurality of cloud providers. The cloud manager can preferably concurrently synchronize a first set of the plurality of authored works to a primary cloud provider and a second set of the plurality of authored works to a secondary cloud provider wherein the primary cloud provider has a first transfer format and the secondary cloud provider has a second transfer format that is different than the first transfer format.

Yet another aspect is a computer program for facilitated synchronization of a web application to a cloud provider. The computer program includes means for accessing a remote cloud manager, means for selecting a plurality of web resources for the web application at the remote cloud manager, the plurality of web resources located at at least one cloud provider, means for identifying a plurality of authored works for the web application, and means for synchronizing the plurality of web resources and the authored works to deploy the web application to a cloud provider.

Yet another aspect is a method for facilitated concurrent synchronization of a web application to a plurality of cloud providers. The method includes selecting a plurality of web resources for the web application at the remote cloud manager. The plurality of web resources is located at a plurality of cloud providers. The method also includes identifying a plurality of authored works for the web application. The method also includes concurrently synchronizing the plurality of web resources and the authored works at the plurality of cloud providers.

Yet another aspect is a method for facilitated concurrent synchronization of a web application to a plurality of cloud providers. The method includes selecting a plurality of web resources for the web application at a remote cloud manager. The plurality of web resources is located at a plurality of cloud providers. The method also includes identifying a plurality of authored works for the web application. The method also includes synchronizing a first plurality of web resources and the authored works for the web application to a first of the plurality of cloud providers and concurrently synchronizing a second plurality of web resources and the authored works for the web application to a second of the plurality of cloud providers.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention provides a novel system and method for a user to develop a web application such as a web site, deploy the web application for access over the Internet, manage and monitor the web application to ensure adequate resources are provided during times of heavy traffic such as heavy viewing of a web site.

Figure 1:
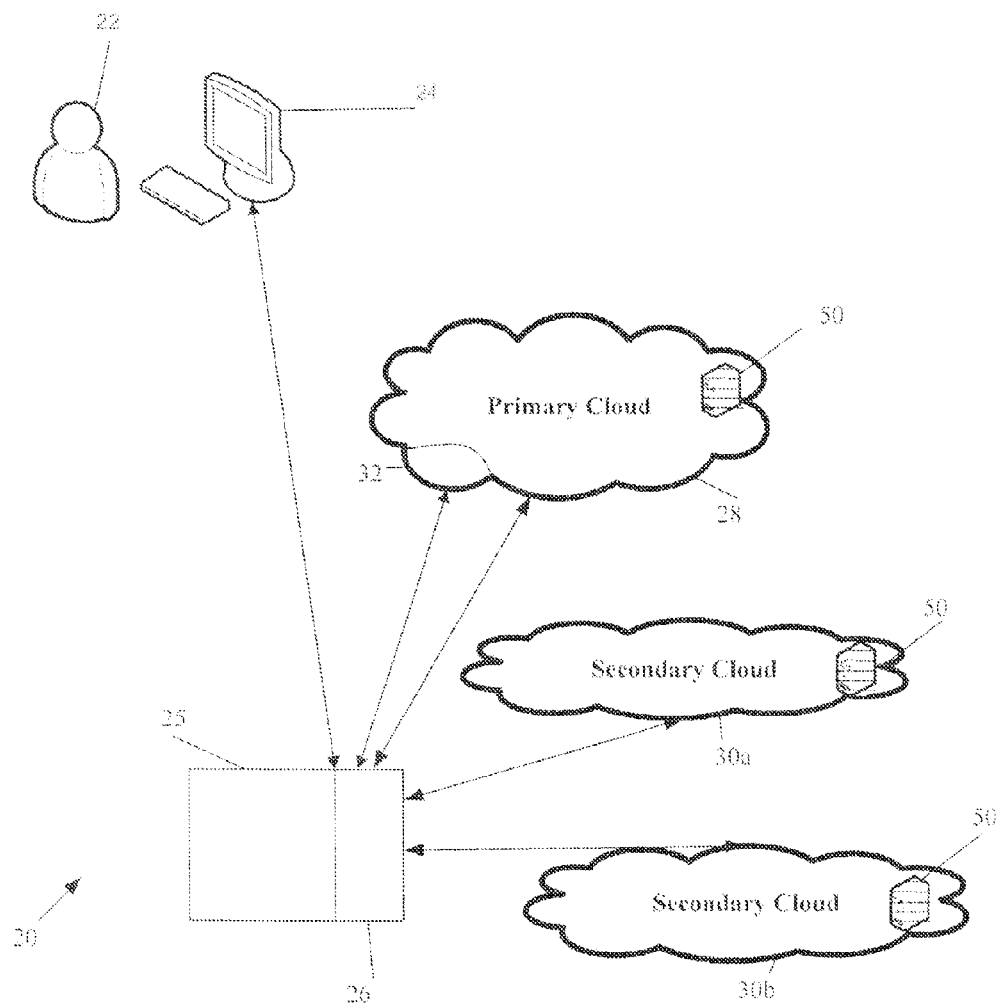
FIG. 1 is a block diagram of a preferred embodiment of a system for synchronization of a web application to at least one cloud provider.
Figure 1A:
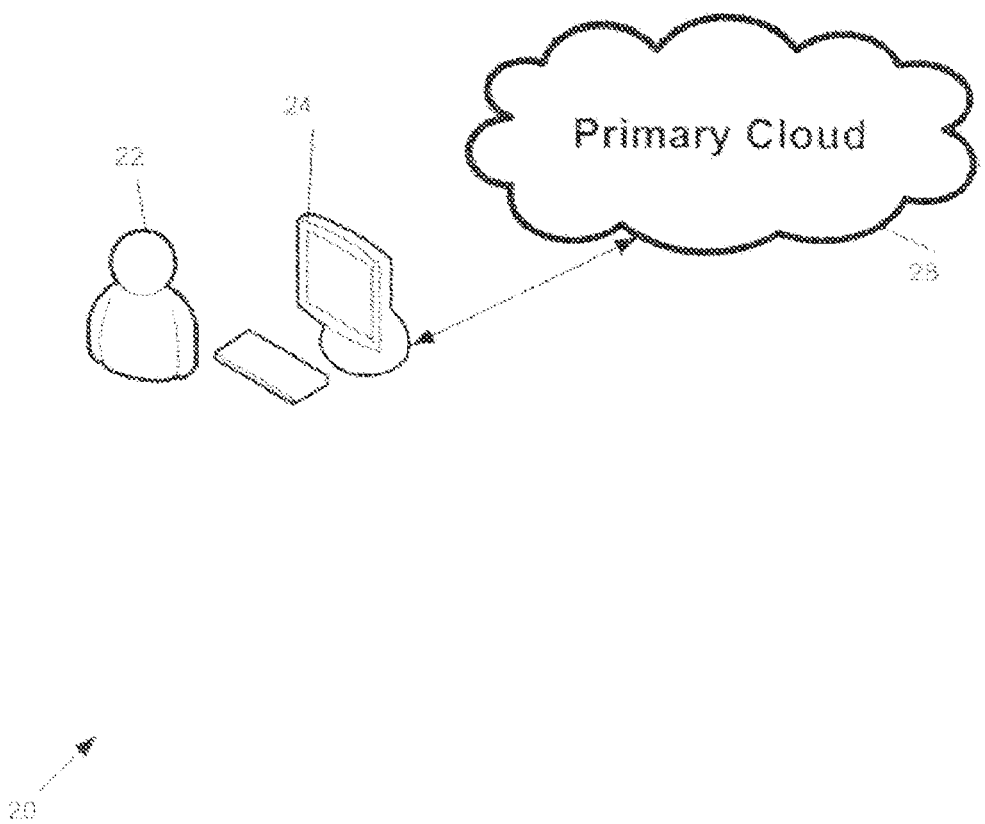
FIG. 1A is a block diagram of a cloud system of the prior art.
Figure 1B:
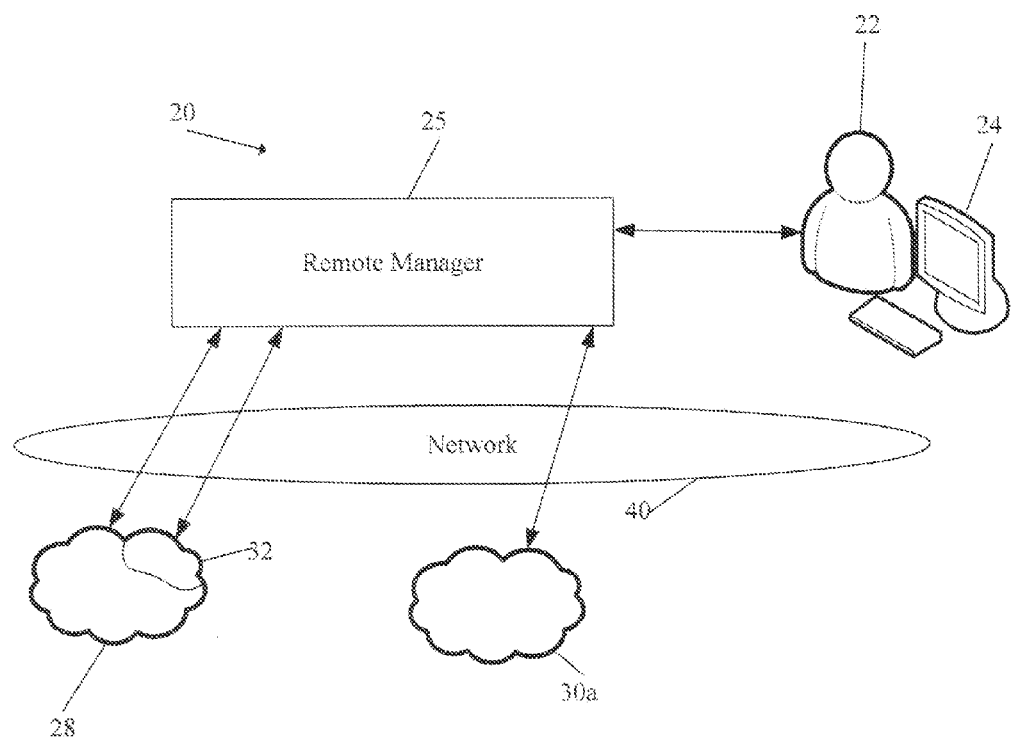
FIG. 1B is a block diagram of an alternative embodiment of a system for synchronization of a web application to at least one cloud provider.
Figure 1C:
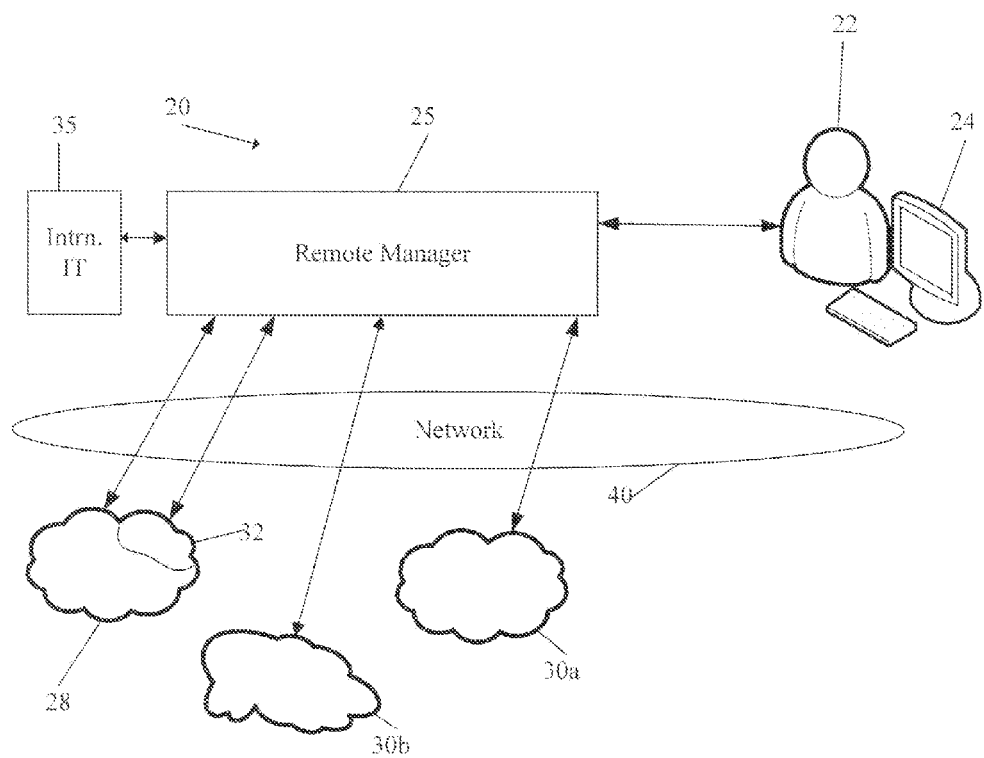
FIG. 1C is a block diagram of an alternative embodiment of a system for synchronization of a web application to at least one cloud provider.

As shown in FIGS. 1, 1B and 1C, a system 20 generally includes a cloud manager 25 having a cloud manager API 26, a primary cloud provider 28, a secondary cloud provider 30*a* and a second secondary cloud provider 30*b*. A web application 32 is located at the primary cloud provider 28. The cloud manager 25 communicates over a network, such as network 40 shown in FIGS. 1B and 1C, directly with the web application 32, the primary cloud provider 28, the secondary cloud provider 30*a* and the second secondary cloud provider 30*b*. Those skilled in the pertinent art will recognize that the system may only include one cloud provider, or more than three cloud providers. A developer/user 22 operating from a user interface 24 also communicates with the remote manager 25. Preferably, the network is the Internet. As shown in FIG. 1C, the cloud manager 25 can also communicate with an internal IT site 35. The cloud manager 25 can transfer the web application from and to a provision state, from and to a staging state and from and to a live state. The cloud manager 25 allows the developer 22 to monitor the performance of the web application. The cloud manager 25 automatically wires web resources from the cloud providers 28 and 30 to the web application as needed depending on the load activity on the web application 32.

The cloud manager 25 is preferably an abstraction layer that can utilize multiple cloud providers for a single web application. The cloud manager 25 allows for facilitated synchronization of a web application to a cloud provider and concurrent synchronization to multiple cloud providers. Thus, if a web application 32 requires additional web resources, the cloud manager 25 can simultaneously contact multiple cloud providers and simultaneously allocate web resources from multiple cloud providers to the web application 32. The cloud manager 25 can pull in new servers based on the load activity of a web application. The cloud manager 25 is preferably includes a universal cloud API which allows for access to and allocation of web resources from multiple cloud providers. The cloud manager 25 can also be programmed to provide a predetermined return on investment for a developer wherein the cloud manager 25 allocates resources based on a monetary return from increased activity on a web application. The developer 22 can set limits on the resources or expenses for the web application, or set ratios for return on investment.

The cloud manager 25 can also move a web application to VMware for virtualization purposes. Thus, the cloud manager 25 can take a web site that is live and pull it back to a VMware image. The cloud manager 25 also allows a developer 22 to validate a web site in a staging state before going live with the web site. The developer 22 can validate the web site from a user interface 24. Further, the cloud manager 25 allows for team control of a web site so that various developers can access and control a web application 32.

A user interface 24 (also referred to as UI) is typically a computer which includes a processing means for interacting with various input and output devices ("I/O devices"), and various networks. The I/O Devices can be drives, a keyboard, a display, a scanner, a mouse and the like. The processing means typically includes a CPU such as an INTEL PENTIUM™ processor or the like. The processing means also preferably includes a memory (random access memory and read only memory) and interfaces for communicating with networks and the I/O Devices.

An integrated development environment ("IDE"), such as disclosed in Colton et al., U.S. patent Ser. No. 12/264,882, filed Nov. 4, 2008, for a System And Method For Developing, Deploying, Managing And Monitoring A Web Application In Single Environment which is hereby incorporated by reference in its entirety, may be used with the system and method disclosed herein. The IDE provides a user 22 with the tools necessary to build a Web application such as a Web site. One such IDE is set forth at aptana.com, which is hereby incorporated by reference in its entirety. The APTANA IDE is an open-source, cross-platform, JAVA script-focused development environment for preferably building AJAX applications. However, those skilled in the pertinent art will recognize that other IDEs may be utilized without departing from the scope and spirit of the present invention. The IDE is provided to facilitate the development of software applications or other software programs by one or more software developers. The IDE can include one or more servers, workstations, and other components, as well as languages, compilers, editors, and other tools used by developers in the development environment. The IDE is preferably confined to a single geographic location or alternatively can be distributed across a plurality of geographic locations. A geographically diverse configuration would typically include one or more communication channels (networks or otherwise) among the various development locations to allow for a collaborative work environment. The IDE includes a suite of tools to assist in Web application development projects. Various aspects of a preferred IDE are described below in conjunction with the system and method.

The primary cloud provider 28, first secondary cloud provider 30a and second secondary cloud provider 30b, and any other cloud providers, each provide Web resources that may be used for the Web application 32. The Web resources are primarily servers, owned by a third party provider (such as the AMAZON ELASTIC COMPUTE CLOUD, JOYENT, and GOOGLE APPS) such that the user does not need to make a substantial investment in computer hardware and can scale resources depending on the user's needs.

The cloud manager 25 automatically manages the Web resource needs of the Web application 32. The cloud manager 25 provisions the Web application 32, syncs the Web application 32, and automatically provides scalability for the Web application 32. A more detailed explanation of the cloud manager is provided below.

Figure 2:
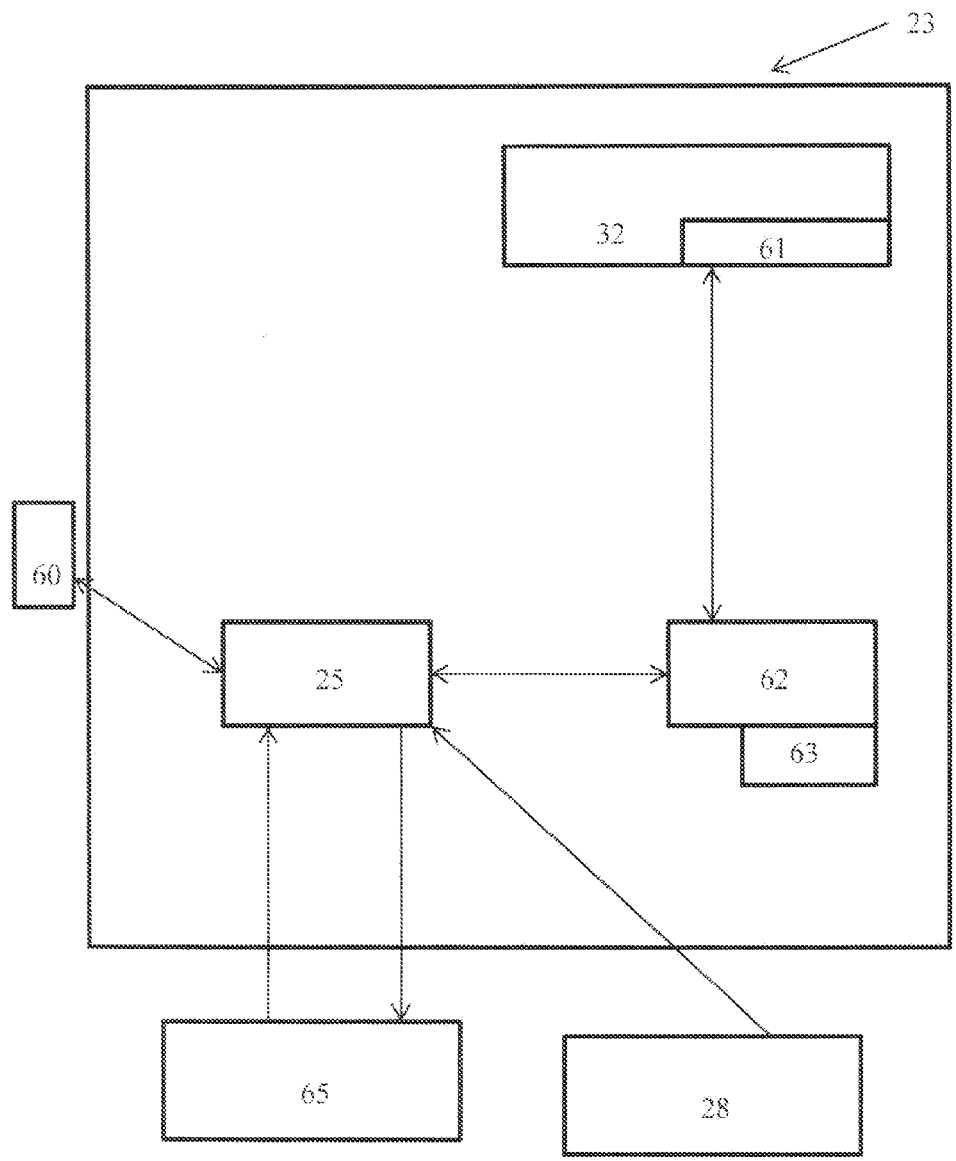
FIG. 2 is a block diagram of a preferred embodiment of the software architecture.

FIG. 2 is a block diagram of the software architecture of the present invention. FIG. 2 illustrates the overall architecture residing in and interacting with the IDE 23. The cloud manager 25 loads once the user logs in using his Aptana ID. This ID is persisted between startup, so that the cloud manager 25 may be loaded immediately when the IDE 23 begins, for example the APTANA Studio. The cloud manager 25 first loads from a local data store model 60, if it exists, and then synchronizes the local data store model 60 with a remote site manager model 65. Any model change events will only be fired for differences found between the local data store model 60 and the site manager model 65. The components of the architecture include the IDE, (STUDIO), the MyCloud Web application 32, the MyCloud server, the site manager provider and the site manager. The MyCloud Web application 32 is located inside an embedded browser of the IDE 23. The MyCloud server comprises a JETTY HTTP server 63, servlets for the IDE requests, (e.g., obtaining projects in the local workspace), servlets that delegate to site manager services (e.g., listing the deployed projects and their status), and a COMET client 62 for messaging bus (pumps events from a messaging queue and a local store). The site manager provider performs client implementation of site manager services, polling the site manager for notifications an events (adds events to a messaging queue and a local store), and maintains and synchronizes a user/project model with the site manager. The site manager contains the Web services for deployed projects and account management.

In an example of a preferred embodiment, the portal index page is at com.aptana.ide.server.jetty/content/index.html.

```
function setup ()
{
    dojo.require( "dojox.cometd") ;
    dojo.connect (dojox.cometd, "finishInit",
        function (type, data, evt, request) {
            dojox.cometd.subscribe (
            "/portal/portlets/"+ dojox.cometd.clientId,
                "echoRpcReturn"
            );
        }
    );
    Dojox.cometd.init("/cometd");
}
```

The flow preferably involves the initial portal index page requesting a list of portlets from /portlal/portlets. The IDE 23 returns a list of configured portlets and URL to request a bootstrap JavaScript code (e.g., /portlets/cloud). The portal index page executes the bootstrap code to alter the model and the user interface as appropriate per portlet. The portlet can continue to request new files and resources from for example /portlets/portlet_id/sub urls (/portlets/cloud/images/cloud_portlet_banner.png).

The MyCloud Servlets involve comet architecture that specifies channels for publishing and subscription. A common model involves a client subscribing to a client-id specific channel, but publishing on a generic channel. For example, a client subscribes to /portal.portlets.a1234564, the client publishes to /portal/portlets, with published implicitly including the client ID. The return messages are routed to the specific channel subscribed to by the user. Alternatively, the return messages are routed to a global "broadcast" channel, such as /projects.

The portal is preferably an AJAX Web application that operates on top of the internal Jetty server 63 and communicates with the IDE 23 through comet 61. End users access the portal through IDE buttons, and the basics of starting up and debugging are briefly discussed below. In order to ensure that no XHR requests remain unterminated (or waiting to time out) when the portal is closed and then re-opened, the IDE 23 completely terminates the internal JETTY server 63 every time that a user closes the portal view. As such, the portal needs to use a different port every time, starting with 8500 and incrementing by 1 each subsequent time the portal is loaded. Similarly, the cometd server runs on its own port, starting with 8600. For the portal to load properly, the portal should preferably be requested as follows: http://localhost: [port number]/index.html?port=[comet port number]. For debugging the portal, the log output contains every major action logged preferably using FIREBUG. Therefore, a review of the log output should identify the problem.

URL parameters are used to have the portal load with specific content rather than the default "Home" page. A specific tab is loaded with a query string pram: tab having possible values of 'my_aptana' or 'my_cloud', for example, http://localhost:8500/index.html?port=8600&tab=my cloud. To a load a specific site in "My Cloud" query string param: siteId with possible values of any site Id for the logged in user for example: http://localhost:8500/index.html?port=8600&tab=my cloud&siteId=1234.

To deploy a project to the Cloud, query string param: project. Possible Values are any undeployed project (url encoded, case-sensitive), for example: http://localhost:8500/index.html?port=8600&project=MyCoolProject.

To start at a specific product in "My Aptana", query string param: product. Possible Values are studio, plugins, jaxer and cloud. For example: http://localhost:8500/index.html?port=8600&product=plugins.

The servlet listing returns JSON data. Preferably, JSON data will be parsed, not evaluated. Model API directly on cloud manager, or have channels like /project/create?.

Studio-centric requests involve license information, preferences and projects (date/time last updated).

Figure 2A:
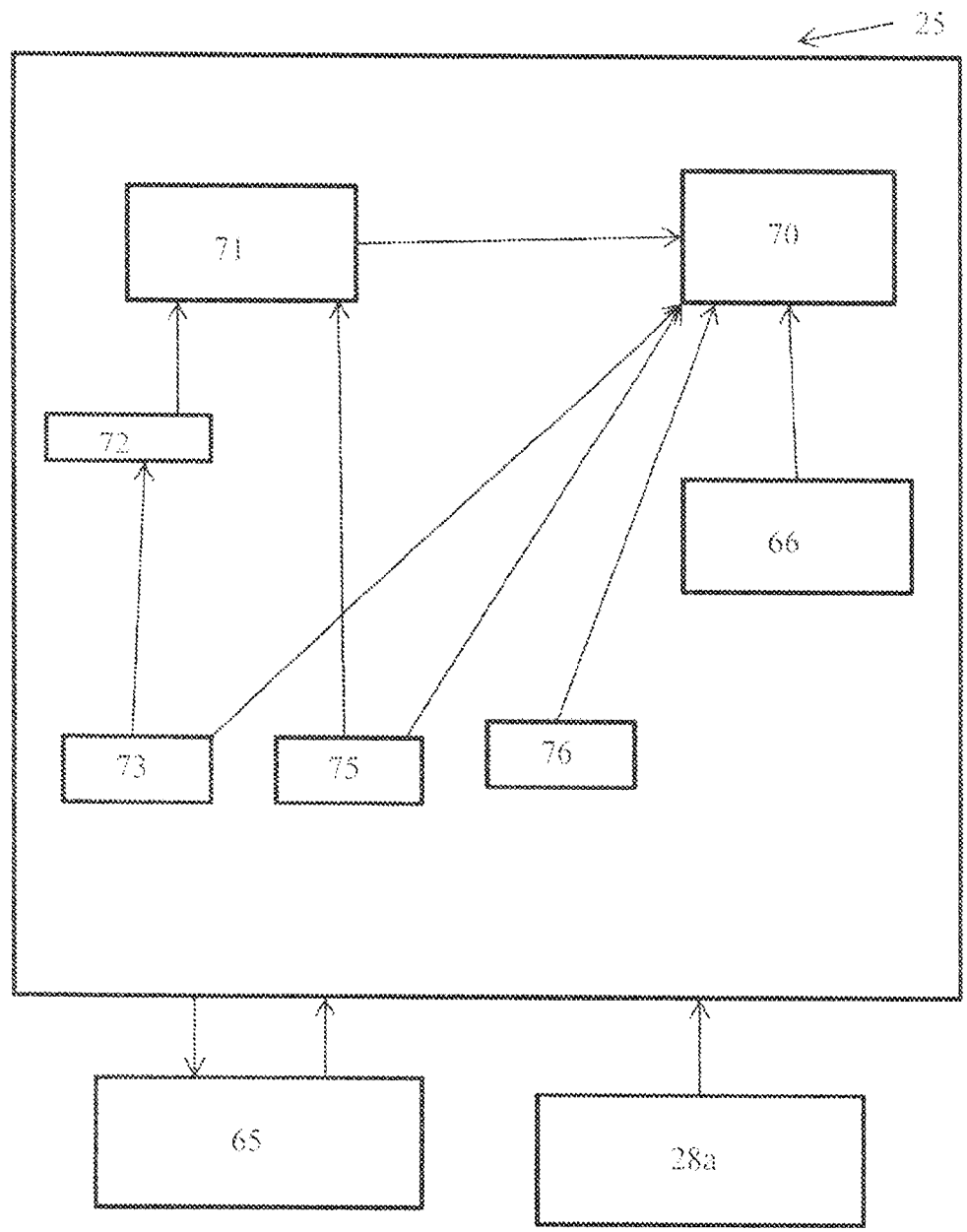
FIG. 2A is a block diagram of a preferred embodiment of a cloud manager.

FIG. 2A provides an in-depth illustration of the cloud manager 25. The cloud manager 25, which is inside the IDE 23, synchronizes with the remote site manager model 65 for a given user and sends updates to the site manager model 65. The cloud manager 25 synchronizes directly against Web applications 32 via model information return in the site manager model 65. This is used for the Web application statistics model 66 which is shown graphically to the user. The cloud manager 25 synchronizes with cloud site model 28a. A core model object 70 is configured for model elements to synchronize against a remote model representation. Core model object 70 and core group object 71 does all of the following: fire events 75 when the remote model changes; delete themselves from the remote model; and serializes to a local data store 72 and 73 to enable an off-line mode. Each core model object 70 has a unique, well-known remote location 76, against which it is synchronized. The cloud manager 25 is configurable with request and response protocol handlers. Request protocol handlers authenticate a request, while response protocol handlers are responsible for decoding a response into a form, from which the object may be rebuilt. The listener architecture allows subscription to a root element, which will subscribe the listener to all child objects of that model element.

Figure 2B:
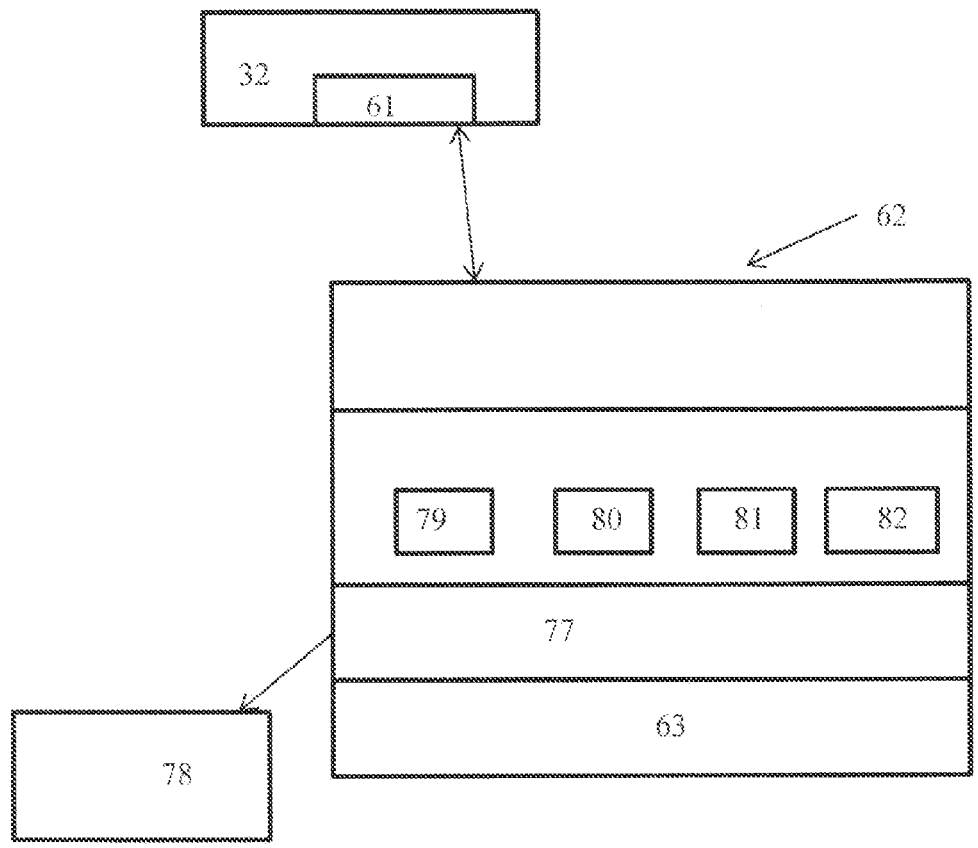
FIG. 2B is a block diagram of a preferred embodiment of isolated components of the software architecture.

FIG. 2B illustrates interactions with a comet server 61. Comet clients 62 are pieces of IDE functionality that are called from the My Cloud Web application 32. Comet clients 62 fire events on well-known channels to update content. Comet clients 62 also respond to requests to get or set properties on remote model elements. In addition, they handle requests to synchronize the local and remote cloud application files. Comet clients 62 are configured via XML and dynamically loaded when the JETTY HTTP Server 63 is started. A Comet client loader 77 loads a Comet client configuration file 78. Comet clients 62 are contributed across multiple IDE plugins. The JETTY HTTP Server 63 serves both Comet requests and standard HTTP content requests. The Comet clients 62 integrate with requests for user interface elements outside the browser, including: opening wizards interface 81, views, perspectives, statistics client interface 82, deploy project client interface 79; and starting or stopping the local JAXER™ server interface 80. The Comet clients 62 also respond to requests to start, stop or restart services on the remote cloud application.

The core model object 70 interfaces with an ILocationObject. Each object has a unique location that is used to obtain and update the remote model for the object. The core model object 70 also interfaces with the ISynchronizableObject. Each object has a core set of methods to synchronize with the remote model. The core set of methods include the following: commit; update; perform action; and delete. The core model object 70 interfaces with the ITransformObject. Each object is able to serialize and de-serialize itself from either the remote format received from the Site Manager or the format obtained from the local data store when the Site Manager is unreachable. The core model object 70 further interfaces with the IModifiableObject. Each object is able to detect changes in the model and notify listeners when model changes occur. The core model object 70 implements the interfaces. The core group object 71 extends the core model objects 70 and allows encapsulation of grouped objects that are obtained from a single web service call. The group as a whole may be synchronized, or, alternatively, individual objects in the group may be synchronized.

Figure 3:
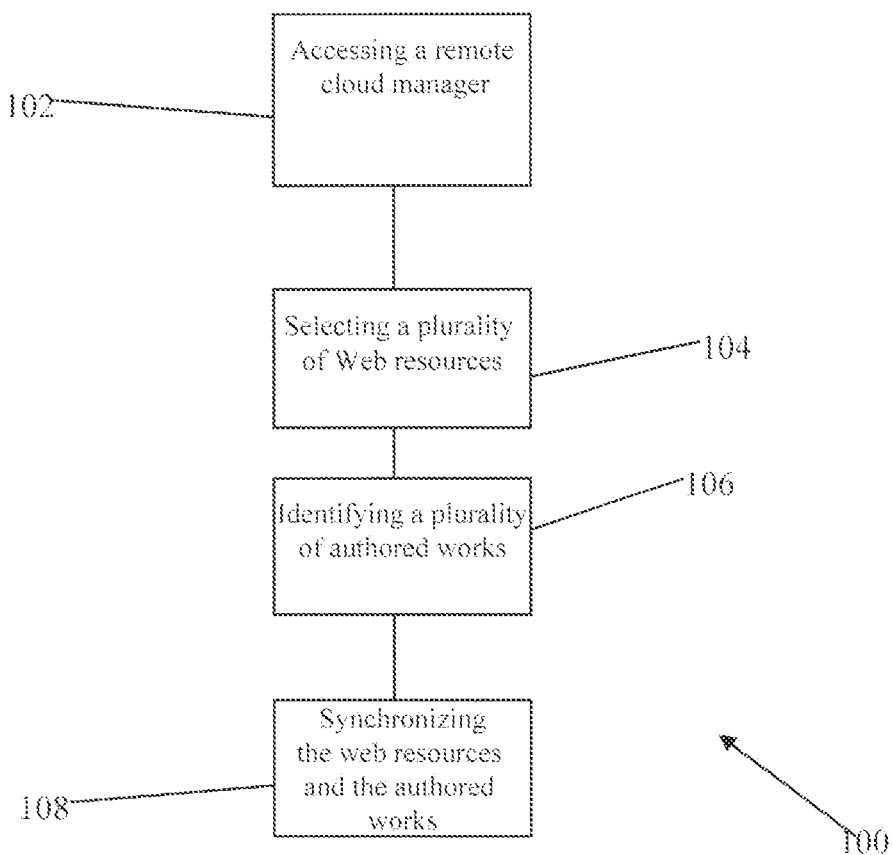
FIG. 3 is a flow chart of a general method for synchronization of a web application to at least one cloud provider.

FIG. 3 is a flow chart of a general method 100. At block 102, a cloud manager is accessed by a user/developer. At block 104, a plurality of web resources are selected for a web application. At block 106, a plurality of authored works for the web application is identified by the cloud manager. At block 108, the cloud manager synchronizes the authored works for the web application to the web resources.

Figure 4:
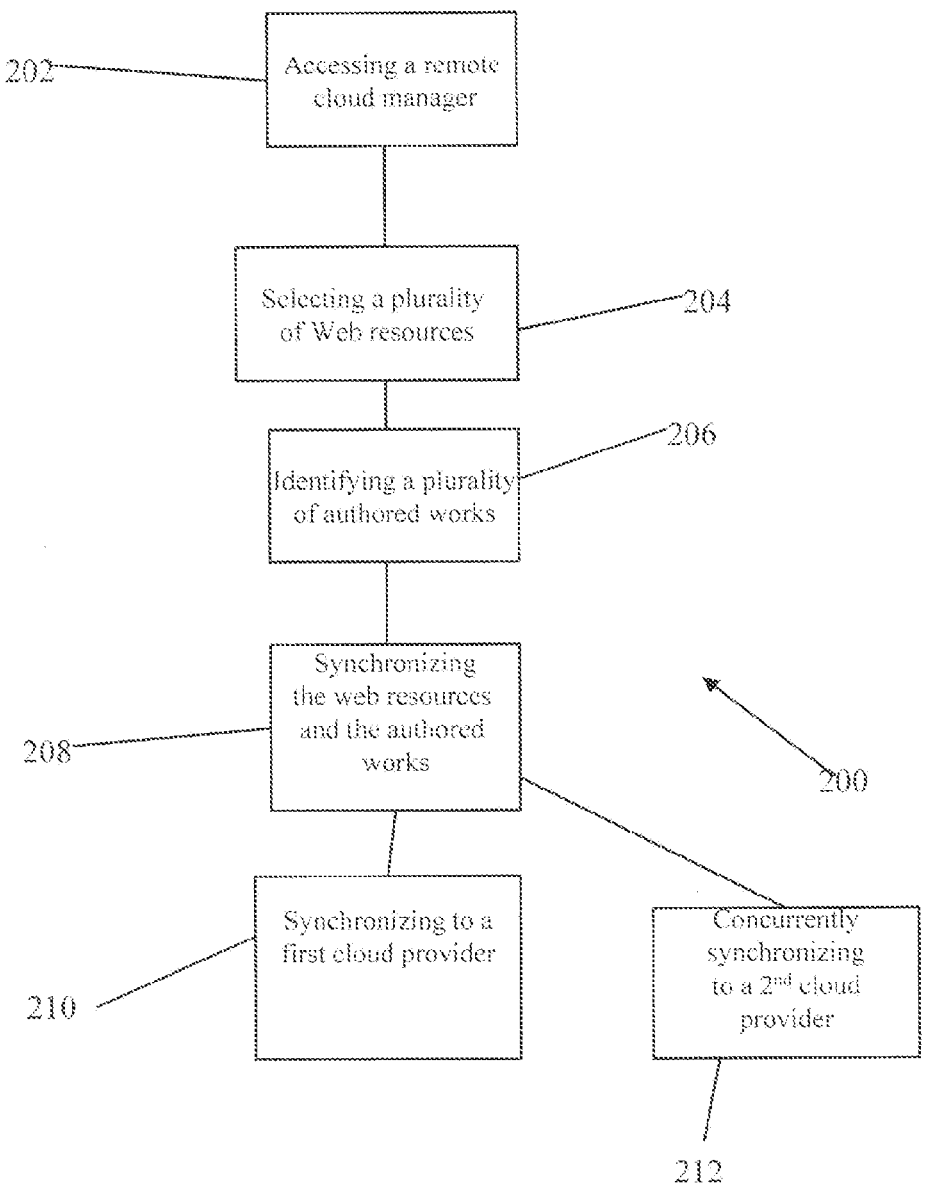
FIG. 4 is a flow chart of a specific method for synchronization of a web application to at least one cloud provider.

FIG. 4 is a flow chart of a specific method 200. At block 202, a cloud manager is accessed by a user/developer. At block 204, a plurality of web resources are selected for a web application. At block 206, a plurality of authored works for the web application is identified by the cloud manager. At block 208, the cloud manager synchronizes the authored works for the web application. Block 210 and 212 are the result of the synchronization at block 208 where a first cloud provider and a second cloud provider are concurrently synchronized.

Figure 5:
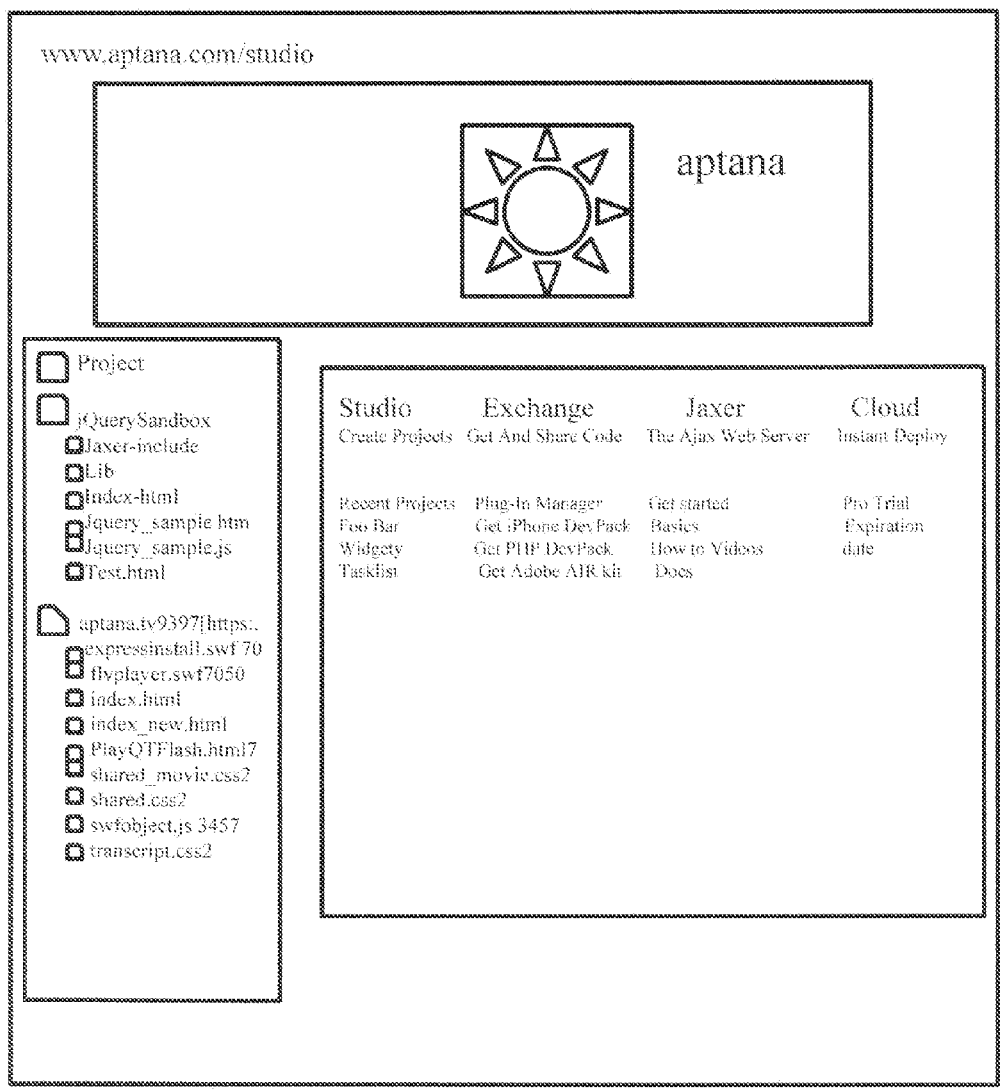
FIG. 5 is a screen page within an IDE on a user-interface illustrating a menu page with an IDE selected.

FIG. 5 illustrates the APTANA start page 300 with the Studio application (IDE) selected. Menus under the Studio application include create projects, recent projects, tasklist, and general Studio information.

The first step in deploying a project to Cloud is to set up a Web site name. By way of example, the user, who is deploying project "gullwing," is asked to enter a preferred Web site name for project "gullwing," such as "cars90210." APTANA Cloud then determines whether the preferred Web site name ("cars90210") is available. At step two, the user selects among various service plans available for the Cloud project. During the third step in deploying a project to Cloud, the user sets up enters his user information or sets up a new user account. Additional steps in deploying a project to Cloud include setting up billing information, accepting the Cloud services agreement, and confirming and placing the order. Upon placement of the order, the Web page is displayed, notifying the user that the site is being provisioned. Provisioning the site preferably includes the following steps: (1) contacting APTANA Cloud; (2) setting up the necessary servers; and (3) configuring the Web site.

Figure 6:
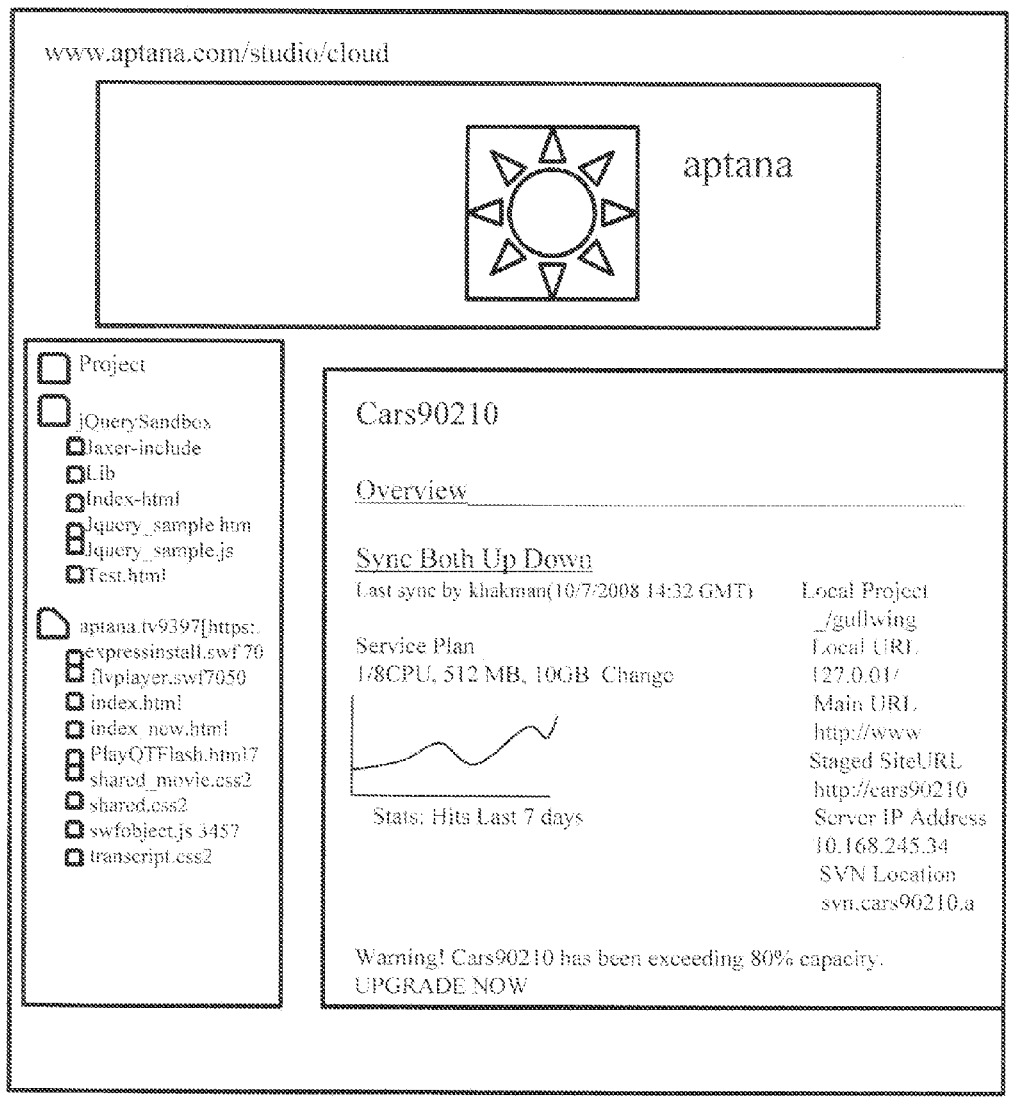
FIG. 6 is a screen page within an IDE on a user-interface illustrating a monitoring page for a Web Application.

Once a site has been provisioned on APTANA Cloud, a user may monitor the status of that Web site. FIG. 6 illustrates the particular My Cloud information for a selected site that is displayed to the user. For example, in the Web page 302 in FIG. 6, the details of the "cars90210" site are displayed under the "Overview" tab. Details include: the particular service plan selected for the site; a graph illustrating the number of hits for the site over a selected period of time; the local project name for the site; the local, main and staged site URLs; the server IP address; and the SVN location. In addition, an Events window may display any alerts regarding the site, such as a warning that the site is nearing its servers' capacity.

A user may add or invite additional users to the particular Cloud project. Users may be designated as either "admin" or "developer." Developers may sync projects, folders and files to the site. Admins have the ability to add or remove users for the site as well as sync projects, folders and files.

One of the benefits of APTANA Cloud is that it provides to the user valuable information regarding popularity of the project site such as "Hits Last 35 Days" for the project site "cars90210."

Figure 7:
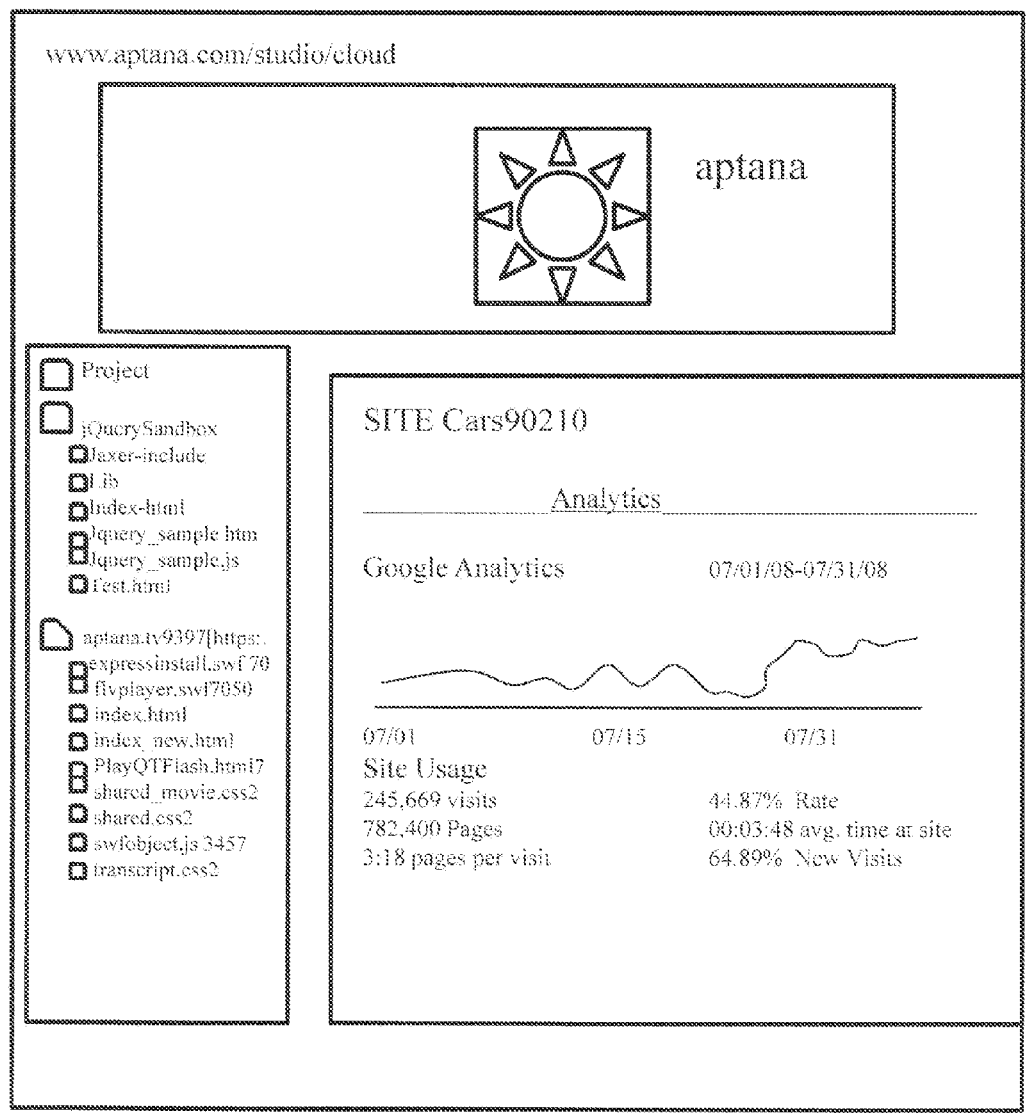
FIG. 7 is a screen page within an IDE on a user-interface illustrating a GOOGLE Analytics page for a Web Application.

With APTANA Cloud a user may incorporate GOOGLE Analytics to further monitor the project site. For example, the user may set up GOOGLE Analytics for the project site "cars 90210." Once the site has been set up with GOOGLE Analytics, future displays under the "Analytics" may be similar to that shown in the Web page 304 in FIG. 7, including graphical and numerical data regarding site usage.

Figure 8:
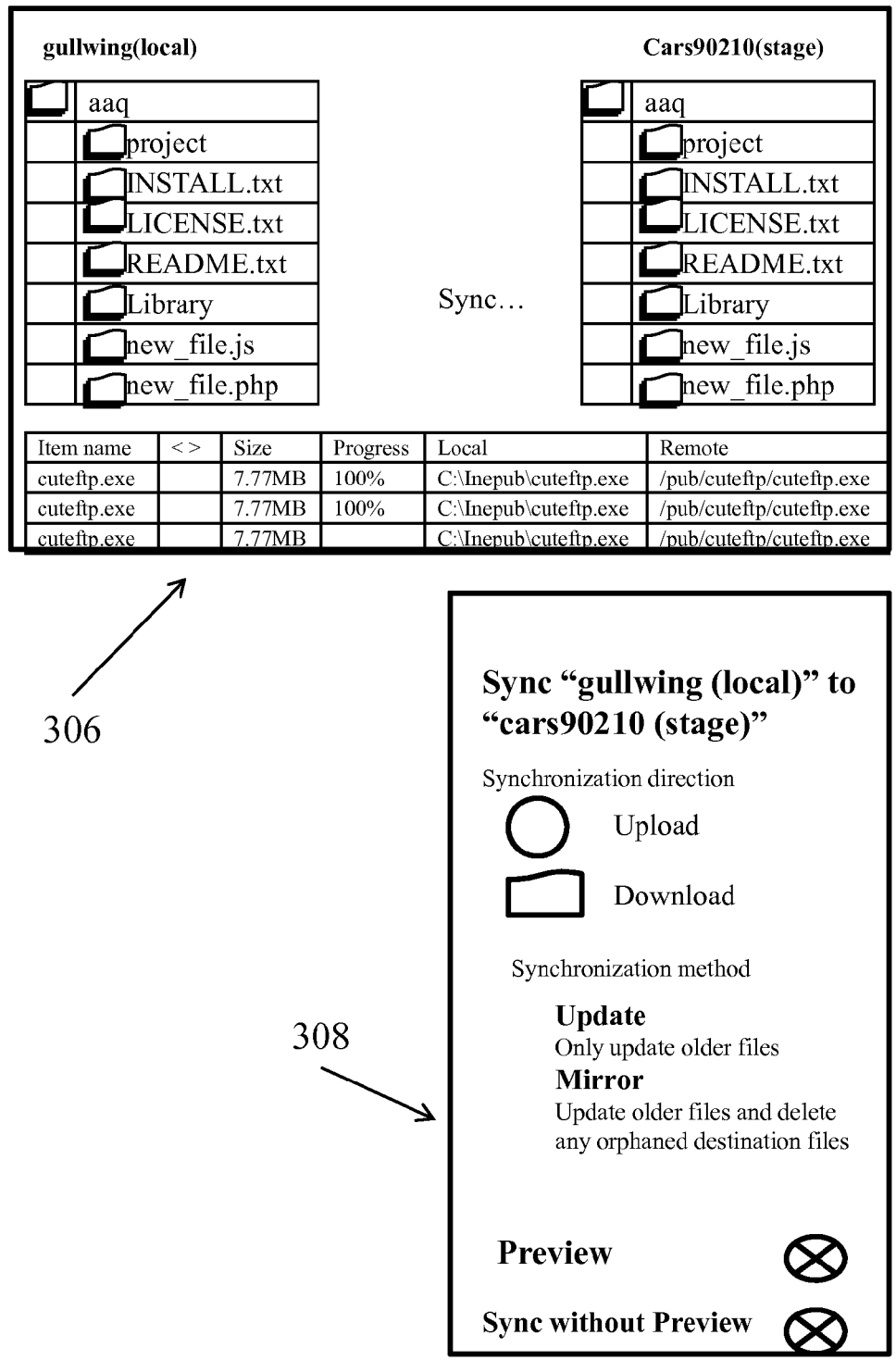
FIG. 8 illustrates a synching page for a Web Application from a site overview and a project view.
Figure 9:
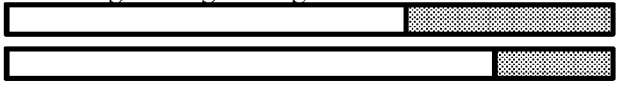
FIG. 9 is a screen page on a user-interface illustrating a synching page for a Web Application.
Figure 9:

When the user modifies a project, the local site must then be synced with the stage site. FIG. 8 illustrates the synching of local site "gullwing" to project site "cars90210" with view of a Web site overview 306 and a project view 308. The Web page 310 shown in FIG. 9 provides further details regarding the syncing of the "gullwing" local site to the "cars90210" project site.

A detailed example of a preferred embodiment of the operation of the present invention is set forth below.

Global IDE requests are made in the following manner:
Projects
    Client ID: 'projects'
    To Channel ID: '/portal/projects'
    Return Channel ID: '/portal/projects/'+publisherId
    Return Data: JSON array of project names
Show a Project in the Projects View:
    To Channel ID: '/portal/projects/show'
    To Data: project: 'project name'
    Return: Does not reply
Open a Perspective
    To Channel ID: '/portal/perspectives/show'
    To Data: id:'perspective id'
    Return: Does not reply
Open a View
    To Channel ID: '/portal/views/show'
    To Data: id:'view id'
    Return: Does not reply
Open a Browser
    To Channel ID: '/portal/browser'
    To Data: url:'url to open in the browser'
    Return: Does not reply
Clients
    Client ID: 'client listing'
    To Channel ID: '/portal/client/listings'
    Return Channel ID: '/portal/client/listings'+publishedId
    Return Data: JSON array of client IDs
Open a New Project Wizard
    Client ID: 'new project'
    To Channel ID: '/portal/projects/new'
    To Data: String id of wizard to open, defaults to web project wizard if empty string
    Return Channel: Does not reply
    Return Data: Does not reply
Get or Set a Preference
    To Channel ID: '/portal/preferences'
    To Data: request:'get'j'set' name:'name of pref' value:'value of pref if setting
    Return Data: action:'get' name:'name of pref' value:'value of pref if getting' (No return if setting)
Get the License Status
    To Channel ID: '/portal/license'
    To Data: action:'licenseStatus'
type:'pro'j'trial'j'none'expires:'MM/DD/YYYY' (if license is pro or trial)
Open a Wizard
    To Channel ID: '/portal/wizard'
    To Data: id:'wizard id' request:'new'l'import'l'export'
    No reply
    Aptana ID requests are generated as follows:
Get Signed in User
    Client ID: 'aptana, —user'
    To Channel ID: '/portal/user'
    Return Channel ID: '/porta I/user/'+pu bl isherId
    Return Data User name or empty string if no user signed in
Sign In a User
    Client ID: 'aptana_user_login'
    To Channel ID: '/portal/user/login'
    To Data:
    request: 'loginUser'
    username: 'username'
    password: 'password'
    Return Channel: '/portal/user/'+publisherId
    Return Data:
    action: 'loginUser'
    userValid: true/false
    usernameValid: true false
    passwordValid: true false
Log Out a User
    Client ID: TBD
    To Channel ID: '/portal/user/logout'
    To Channel Data:
    arequest: 'logoutUser'
    Return Channel: '/portal/user/'+publisherId
    Return Data:
    action: 'logoutUser'
    success: true/false
Create New User
    Client ID: TBD
    To Channel ID: '/portal/user/create'
    To Channel Data:
    request: 'createUser'
    username: 'username'
    password: 'password'
    email: 'email'
    Return Channel: '/portal/user/'+publisherId
    Return Data:
    action: 'createUser'
    success: true/false
    usernameValid: true/false (false if username used)
    (any other reasons for failure can be added . . . )
To Make Message center requests, the following are preferably used:
Display the Message Center
    To Channel ID: '/portal/messages/show'
    To Data: none
    Return: Does not reply
Unread Message Count
    Client ID: 'unread messages'
    To Channel ID: '/portal/messages'
    Return Channel ID: Vporta I/messages/'+pu bl isherId
    Return Data Integer value of the number of unread messages
Urgent Unread Message Count
    To Channel ID: '/portal/messages/urgent'
    Return Channel ID: '/portal/messages/urgent/'+publisherId
    Return Data Integer value of the number of urgent unread messages
Plugins/Features requests are generated as follows:
Plugins List
    Client ID: TBD
    To Channel ID: '/portal/plugins/list'
    To Data:
    request: 'listPlugins'
    Return Channel ID: '/portal/plugins/list/'+publisherId
    Return Data:
    action: 'listPlugins'
    popular: [(array of hash maps . . . )
        id: 'pluginId'
        name: 'pluginName'
        description: 'plugin Description'
        link: 'pluginSiteLink'
        installed: true/false (whether or not the plugin is installed)
        update: true/false (whether or not an update is available)
    other: same spec as above, this is the list of third-party plugins
Plugins to Install (Deprecated in favor of above . . . )
    Client ID: 'install plugins'
    To Channel ID: '/portal/plugins/list'
    Return Channel ID: '/portal/plugins/list'+publisherId
    Return Data: JSON structure of plugins that are installable Get Changes Features
    Client ID: 'feature changes'
    To Channel ID: '/portal/features/changes'
    Return Channel ID: '/portal/features/changes/'+publisherId
    Return Data: action:'featureChanges' changesExist: true I false
    changes: [{icl:'feature id', label:'label',newVersion:'new version', oldVersion:'old version', provider:'provider'} . . . ]
Install a Plugin
    To Channel ID: '/portal/plugins/install'
    To Message String plugin id to install
    Return Channel ID: '/portal/plugins/install'+publisherId
    Return Data: true if the plugin install was successfully launched
Check for Plugin Updates
    Client ID: 'check-for-updates'
    To Channel ID: '/portal/plugins/updates'
    Return Channel ID: '/portal/plugins/updates/'+publisherId
    Return Data: 'true' I 'false' if a update search was scheduled
    JAXER server requests are made as follows:
Show Jaxer Shell View
    Client ID: '/Portal/jaxer/JaxerClient'
    To Channel ID: '/portal/jaxer/laxerShellView'
Show Jaxer Activity Monitor View
    Client ID: '/Portal/jaxer/JaxerClient'
    To Channel ID: '/portal/jaxer/jaxerActivityMonitor'
Show Jaxer Preference Page
    Client ID: '/portal/jaxer/JaxerClient'
    To Channel ID: '/portal/jaxer/jaxerPreferences'
Show Servers View
    Client ID: '/portal/jaxer/JaxerClient'
    To Channel ID: '/portal/jaxer/jaxerServersView'
Show Jaxer Package Server Dialog
    Client ID: '/Portal/jaxer/laxerClient'
    To Channel ID: '/portal/jaxer/jaxerPackageServer'
Get Internal Jaxer Server State
    Client ID: '/Portal/jaxer/JaxerControllr'
    To Channel ID: '/portal/jaxer/jaxerController'
    To Data: request:'serverStatus'
    Return Channel ID: '/portal/jaxer/jaxerController/'+publisherId
    Return Data action:'serverStatus' status: 'running'j'stopped'
Set Internal Jaxer Server State
    Client ID: '/Portal/jaxer/laxerClient'
    To Channel ID: '/portal/jaxer/jaxerController'
    To Data: req uest:'control Server' setState:'start'j'stop'
    Return Channel ID: '/portal/jaxer/jaxerController'
    Return Data: action:'controlServer' setState:'done'
    Cloud-specific requests are preferably generated as follows:
List the Available Products
    To Channel ID: '/portal/cloud/products'
    Return Channel ID: '/portal/cloud/products'+publisherId
    Return Data: action:'IistProducts' products: [{name:'product name', active:'active state', id:'product id'} . . . ]
Browse to a Cloud Sftp Node
    To Channel ID: '/portal/cloud/site/browse'
    To Channel Data: id:'site id' request:'showFile'
    Return: does not reply
Browse to a Remote Cloud File
    To Channel ID: '/portal/cloud/site/browse'
    To Channel Data: id:'site id' request:'showFile' path:'absolute path to file to display in the file view'
    Return: does not reply
Open a Remote Cloud File
    To Channel ID: '/portal/cloud/site/browse'
    To Channel Data: id:'siteid' request:'open File' path:'absolute path to file to display in the editor'
    Return: does not reply
Open the Sync Explorer to a Project and Cloud Sftp Site
    To Channel ID: '/portal/cloud/site/browse'
    To Channel Data: id:'site id' request:'showExplorer'
    Return: does not reply
Get the Name, Type, and Deployed Status of all Workspace Projects
    To Channel ID: '/portal/projects/list'
    Return Channel ID: '/portal/projects/undeployed'+publisherId
    Return Data: projectsExist: true I false projects:[{name:'project name',
    type:'a i r'J'web'J'rai Is'J'ph p'l'un known', deployed: true I fa Ise,
    siteId:'id of site if deployed'}]
Log to Cloud Console and Ide Log
    To Channel ID: '/portal/cloud/log'
    To Data: string that should be logged
    Response: none
Get Site Statistics
    To Channel ID: '/portal/cloud/statistics'
    To Data: request:'getStats' type:'web'J'resources' id:'site id'
    Response Channel ID: '/portal/cloud/statistics/'+publisherId
    Response Data:
    action: 'getStats'
    id:'site id'
    type: 'web'J'resources'
    groups: [{
        startHour:'two digit hour'
        startMinute:'two digit minute'
        date:'month/day date string'
        groupName: 'groupName' (i.e. Memory, Swap, Hits, etc.),
        dataItems: [{
            data: [array of data. [1,1],[2,2], . . . ]
            label: seriesLabel (what will show in the legend)
            {more data as determined by group name
            (usually avg., max, min, etc.)}]
        other groups as determined by type 1]
Change Project Association for a Site is Preferably Generated as Follows:
    To Channel ID: '/portal/cloud/site/project'
    To Data: req uest:'ch a nge Project' project:'project name' site:'site id'
    Return Channel ID: '/portal/cloud/site/project/'+publisherId
    Return Data: actio n:'cha n ge Project' project:'project name' site:'site id'
Perform a Backup (Data Dump) on a Site is Preferably Generated as Follows:
    To Channel ID: '/portal/cloud/site/dump'
    To Data: request:'dumpData' id:'site id'
    Return Channel ID: '/portal/cloud/site/dump/'+publisherId
    Return Data: action:'dumpData' success: true I false id:'site id'
Sync a Site is Preferably Generated as Follows:
    To Channel ID: '/portal/cloud/sync'
    To Data: request:'syncSite' siteId:'id of site to sync'
    Return Data None, start syncs dialog.

Site Manager Availability is Preferably Generated as Follows:
   Client ID:'/portal/cloud/available'
   To Channel ID:'/portal/cloud/available'
   Return Channel ID:'/portal/cloud/available/'+publisherId
   Return Data: action:'cloudStatus' availableftrue I false Domain Name Availability is Preferably Generated as Follows:
   Client ID: '/portal/cloud/deploy/checkSiteName'
   To Channel ID: 'portal/cloud/deploy'
   Message Data: request:'checkSiteName' siteName:'site name to check'
   Return Channel ID: '/portal/cloud/deploy'+publisherId
   Return Data: request:'checkSiteName' siteUsed: true I false User Name Availability is Preferably Generated as Follows:
   Client ID: '/Portal/cloud/deploy/checkUserName'
   To Channel ID: '/portal/cloud/deploy'
   Message Data: request:'checkUserName' userName:'user name to check'
   Return Channel ID: '/portal/cloud/deploy'+publisherId
   Return Data: action:'checkUserName' na meUsed: true I false Validate User is Preferably Generated as Follows:
   Client ID: '/portal/cloud/deploy/validateUser'
   To Channel ID: '/porta I/cl o u d/de ploy'
   Message Data: request:'validateUser'
   username:'user name' password:'password'
   Return Channel ID: '/portal/cloud/deploy'+publisherId
   Return Data: action:'validateUser' userVal id: true I false
      userId:"userId"
   userna me0k: true I false password0k: true I false
   describeUser
   createUser
   updateUser
   deleteUser Deploy a Project
   Client ID: '/portal/cloud/deploy/createSite'
   To Channel ID: '/portal/cloud/deploy'
   To Data:
   req uest:'de ploy Project'
   userId:'user name'
   password:'password'
   siteName:'domain to create'
   project:'name of workspace project'
   servicePlanId:'type of site to create, 'jaxer' for now'
billingInfo:
   firstName:'first name'
   lastName:'Iast name'
   address1:'address 1'
   address2:'address 2'
   city:'city'
   state:'two-digit state'
   country:'country code'
   zip:'zip code'
   phone:'phone number'
   billingName:'name on the credit card'
   creditCardNumber:'credit card number'
   expiration:'credit card expiration'
   cvv2:'code from card'
Return Channel ID: '/portal/cloud/deploy/'+publisherId
   Return Data: action:'deployProject' siteCreated: true I falseid: <id of site created>
   error: <error message if one exists, only uses this value if siteCreated:false>

List Sites
   Client ID: 'list sites'
   To Channel ID: '/portal/cloud/sites'
   Return Channel ID: '/portal/cloud/sites/'+publisherId
   Return Data: action: 'listSites' sites: [{id: 'siteId', status: 'running/error/
   pending', name: 'site name' empty array if no sites or user not logged in Describe a Site
   To Channel ID: '/portal/cloud/sites'
   Return Channel ID: '/portal/cloud/sites/'+publisherId
   To Data:
   request: 'siteInfo'
   id: 'siteId'
   refresh: true I false (optional, if true return action will be siteInfo Refresh)
   Return Data:
   action: 'siteInfo'
   type: 'servicePlanType' (jaxer for now)
   project: 'projectName'
   domain: 'siteDomain'
   ip: 'siteIp'
   svn:'svn url'
   backups:'backups url'
   db:'url to php my admin'
   analytics:'google analytics url'
   resources:'resource stats url'
   webstats:'web stats url'
   jaxerLog:'path to jaxer log'
   jaxerLogJS:'path to jaxerLogjs'
   jaxerAppsJS:'path to jaxerApps.js'
   jaxerConfigJS:'path to config.js'
   privateLog:'path to access log for private area'
   privateErrorLog:'path to error log for private area'
   publicLog:'path to access log for public area'
   publicErrorLog:'path to error log for public area'
   disk:'latest stats of the percentage of disk being used'
   diskMax:'double number of gigs on box'
   status: 'Running/Pending/Error'
   monitoring: true I false
   lastSync:'Iast sync event content'
   lastSyncTime:'Iast sync event timestamp'
   lastDump:'Iast dump event content'
   lastDumpTime:'Iast dump event timestamp'
   id: 'siteId'
   events: [ ] (eventually an array of hash objects for messages List the Events for a Site
   To Channel ID: '/portal/cloud/site/events'
   To Data: request:'listEvents'
   Return Channel: '/portal/cloud/site/events'
   Return Data: action:'IistEvents' id:'site id'
   events:[{time:'timestamp',severity:'severity id', value:'event content'}]

List the Services on a Site
   Client ID: '/portal/cloud/services'
   To Channel ID: '/portal/cloud/services'
   To Data: request:'listServices' id:'site id'
   Return Channel ID: '/portal/cloud/services/'+publisherId
   Return Data: action:'IistServices' services: [{name:'service name', status:'service status', version:'0.9.7.2824',commands:['command name', . . . ]} . . . ]

Stop/Start a Service on a Site
   To Channel ID: '/portal/cloud/services'
   To Data: request:'changeService' id:'site id'
   serviceAction:'start'j'stop'l'restart'

Upgrade a Service on a Site
    Client ID: '/portal/cloud/services'
    To Channel ID: '/portal/cloud/services'
    To Data: request:'changeService' id:'site id'
        serviceAction:'up grade' version:'new version to upgrade to'
Service Events
    Return Channel ID: '/portal/cloud/site/events/'+siteId+'/services'
    Return Data: {action:'serviceEvent', id:'site id', name:'service name', version:'service version', status:'service status'}
List Available Site Versions
    To Channel ID: '/portal/cloud/services/versions'
    Return Channel ID: '/portal/cloud/services/versions/'+publisherId
    Return Data: action:'IistVersions' services: [{name:'service name', versions: ['version V, ... ]}]
    configureSite; rebootSite; deleteSite; getStats; listRoles; addAccount;
    deleteAccount; create Delegation; delete Delegation; listDelegations;
Get the Channel Types.
    To Channel ID: '/portal/cloud/channelTypes'
    Response Channel ID: '/portal/cloud/channelTypes/'+publisherId
    Response Data: action:'IistChanneiTypes' types:
        [{icl:'channel type id', name:'channel type name'}, ... ]
Get the Event Types
    To Channel ID: '/portal/cloud/eventTypes'
    Response Channel ID: '/portal/cloud/eventTypes/'+publisherId
    Response Data: action:'IistEventTypes' types:[{id:'event type id', name:'event type name'}, ... ]
Get the Subscriptions a User has:
    To Channel ID: '/portal/cloud/subscriptions'
    To Data: request:'IjstSubscriptions'
    Return Channel ID: '/portal/cloud/subscriptions/'+publisherId
    ResponseData:action:'ListSubscriptions'subscriptions:
        [{id:'subscriptionid',event:{id:'eventtypeid',name:'eventtypename'},channel: {id:'channelid',name:'channeltypename',value:'channel value'}]
Add a Subscription
    To Channel ID: '/portal/cloud/subscriptions'
    To Data: request:'addSubscription', value:'subscription value',
    channel:'channel type id', event:'event type id'
    Return Channel ID: '/portal/cloud/subscriptions/'+publisherId
    Response Data: action:'addSubscription' success: true J false
Delete a Subscription
    To Channel ID: '/portal/cloud/subscriptions'
    To Data: request:'deleteSubscription', id:'subscription id'
    Return Channel ID: '/portal/cloud/subscriptions/'+publisherId
    Response Data: action:'deleteSubscription' success: true I fa Ise
List the Billing Accounts
    To Channel ID: '/portal/cloud/billing'
    To Data: request:'IistBilling'
    Response Data: action:'IistBilling' accounts: [{id:'billing account id', name:'billing name', number:'billing number', expiration:'billing expiration
Delete a Billing Account
    To Channel ID: '/portal/cloud/billing'
    To Data: request:'deleteBilling' id:'billing account id'
    Response Data: action:'deleteBilling' success: true I false
Add a Billing Account
    To Channel ID: '/portal/cloud/billing'
    To Data: request:'addBilling' name:'billing name'
        number: 'billing number' expiration:'billing expiration'
    Response Data: action:'addBilling' success: true I fa Ise
List the Site Memberships
    To Channel ID: '/portal/cloud/memberships'
    To Data: request:'IistBilling'
    Response Data: action:'IistMemberships' memberships:
        [{role:'role id', user:'user id'}]
Delete a Billing Account
    To Channel ID: '/portal/cloud/memberships'
    To Data: request:'deleteMembership' id:'membership id' site:'site id'
    Response Data: action:'deleteMembership' success: true I false
Add a Membership
    To Channel ID: '/portal/cloud/memberships'
    To Data: request:'addMembership' role:'role id' user:'user name' id:'site id'
    Response Data: action:'addMembership' success: true false deleteSite
    Client ID: TBD
    To Channel ID: '/portal/cloud/sites'
    To Data:
    request: 'deleteSite'
    id: 'siteId
    Return Data
    action:'deleteSite' success: true false
    backupSite
    suspend Site
    restoreSite
    unsuspendSite
    listBackups
    describeBackup
    remove Backup From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for facilitated synchronization of a web application to a cloud provider, the method comprising:
    configuring a remote cloud manager to work with the web application, comprising:
    selecting a plurality of web resources for the web application, the plurality of web resources located at least at one cloud provider; and
    identifying a plurality of authored works for the web application stored at a user site and accessible over the network for the web application;
    deploying the web application as provisioned to use the plurality of web resources and to incorporate the authored works with the web application; and synchronizing, by the remote cloud manager, the plurality of web resources and the authored works of the web application to the cloud provider.

2. The method according to claim 1 wherein the plurality of authored works comprises graphic files, HTML documents and audio files.

3. The method according to claim 1 wherein the plurality of authored works comprises flash documents, PHP documents and JavaScript documents.

4. The method according to claim 1 wherein identifying a plurality of authored works for the web application comprises providing a file location for each of the plurality of authored works to the cloud manager.

5. A system for facilitated synchronization of a web application to a cloud provider, the system comprising:
   a network;
   a plurality of cloud providers accessible over the network, each of the plurality of cloud providers having a plurality of web resources;
   a plurality of authored works stored at a user site and accessible over the network; and
   a cloud manager configured for identifying at least one of the plurality of authored works for incorporation with the web application, selecting the plurality of web resources for use with the web application and synchronizing the plurality of web resources and the plurality of authored works for the web application as deployed to the cloud provider.

6. The system according to claim 5 wherein the plurality of web resources are a plurality of servers available for use by the web application.

7. The system according to claim 5 wherein the cloud manager communicates with the web application through an Application Programming Interface (API) over the network.

8. The system according to claim 7 wherein the cloud manager communicates with a primary cloud provider and at least one secondary cloud provider through the API over the network.

9. The system according to claim 7 wherein the cloud manager communicates with a primary cloud provider and each of a plurality of secondary cloud providers through the API over the network.

10. The system according to claim 5 wherein the network is the Internet.

11. The system according to claim 5 further comprising an internal IT site, the cloud manager in communication with the internal IT site through an Application Programming Interface (API).

12. The system according to claim 5 wherein the cloud manager communicates with an operator of the web application through a user interface.

13. The system according to claim 12 wherein the cloud manager provides real-time information on the performance of the web application to the operator.

14. The system according to claim 8 wherein the primary cloud provider provides cloud computing services to a plurality of users.

15. The system according to claim 5 wherein the cloud manager varies the level of web resources available to the web application based on load activity associated with the web application.

16. The system according to claim 5 wherein the cloud manager can synchronize to multiple targets comprising public, private and staging.

17. The system according to claim 5 wherein the cloud manager can concurrently synchronize to each of the plurality of cloud providers.

18. The system according to claim 5 wherein the cloud manager can concurrently synchronize a first set of the plurality of authored works to a primary cloud provider and a second set of the plurality of authored works to a secondary cloud provider wherein the primary cloud provider has a first transfer format and the secondary cloud provider has a second transfer format that is different than the first transfer format.

19. A method for facilitated concurrent synchronization of a web application to a plurality of cloud providers, the method comprising:
   configuring a remote cloud manager to work with the web application comprising:
      selecting a plurality of web resources for the web application, the plurality of web resources located at a plurality of cloud providers;
      identifying a plurality of authored works for the web application stored at a user site and accessible over the network for the web application; and
   deploying the web application as provisioned to use the plurality of web resources and to incorporate the authored works with the web application; and
   concurrently synchronizing, by the remote cloud manager, the plurality of web resources and the authored works of the web application to the plurality of cloud providers.

* * * * *